United States Patent Office 2,912,258
Patented Nov. 10, 1959

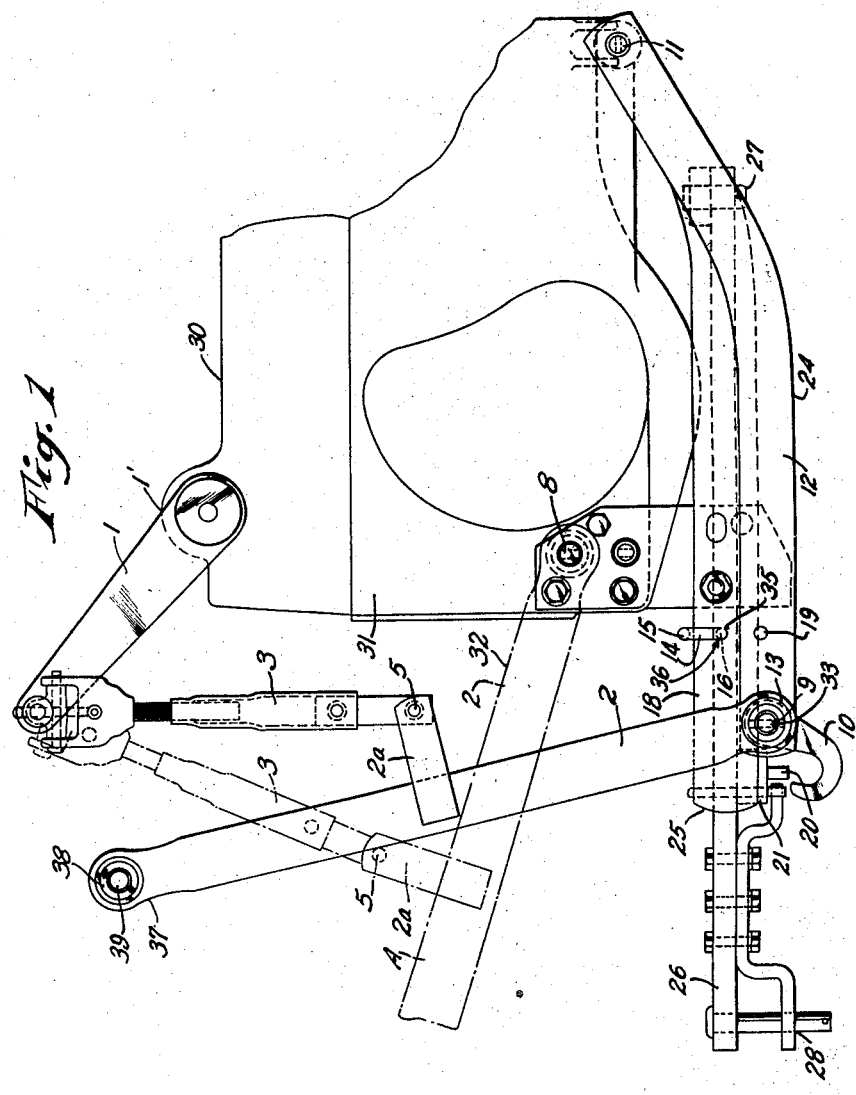

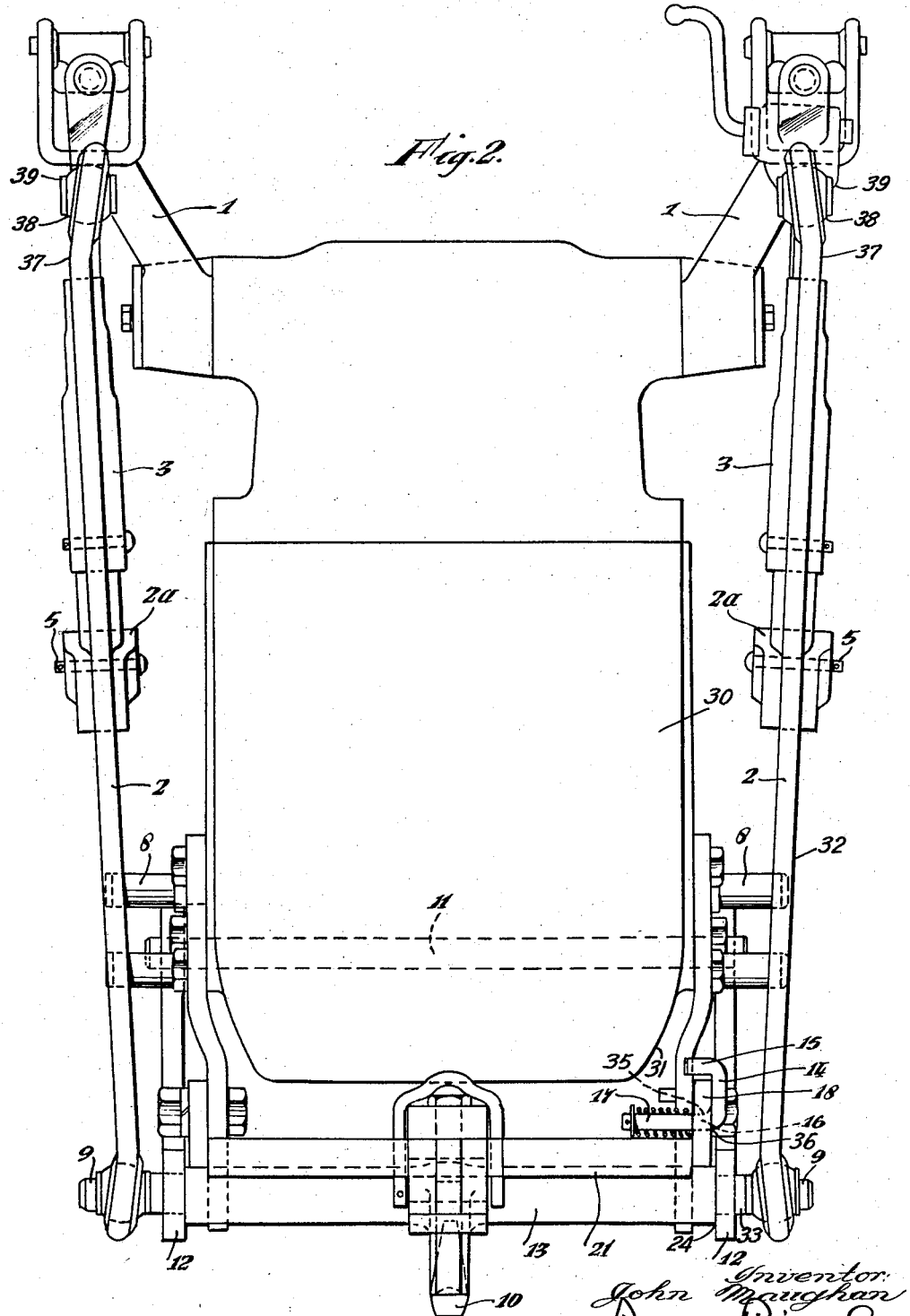

2,912,258
HITCH DEVICE

John Maughan, Doncaster, England, assignor to International Harvester Company, Chicago, Ill., a corporation of New Jersey Application January 9, 1958, Serial No. 707,882

Claims priority, application Great Britain January 21, 1957

10 Claims. (Cl. 280—479)

The principal object of this invention is to provide an improved arrangement of implement and trailer hitch means in which power lift means operate the trailer hitch or implement attaching means when the trailer hitch is not being used.

Another object is to provide for an improved arrangement implement attaching means and trailer hitch whereby the lower links of the implement attaching means may be used to operate the trailer hitch.

Another object is to provide for an improved arrangement of implement attaching means and trailer hitch means whereby power lift means are connected to the lower links of an implement hitch through bracket means to raise and lower the trailer hitch.

A further object is to provide a catch means for retaining the trailer hitch in the inoperative position when using the implement attaching means.

A still further object is to provide a locking means to prevent disengagement of the trailer connection.

Other objects and advantages will become apparent as the following description proceeds, taken in conjunction with the accompanying drawings in which:

Fig. 1 is a view in side elevation illustrating a rear portion of a tractor of the kind referred to provided with implement and trailer hitch means in accordance with the invention, the parts being shown in the positions occupied when the trailer hitch means is in use; and Fig. 2 is a rear elevation corresponding to Fig. 1.

In carrying the invention into effect according to one embodiment, the invention is shown in the drawings as applied to a vehicle or tractor 30 having a frame 31 and implement-attaching means 32 of the three-point type embodying link means such as a pair of laterally spaced lower links 2 having free ends 37 carrying conventional ball sockets 38 with holes 39 to receive coupling elements of an associated implement (not shown) and an upper link (not shown), the lower links being operable by hydraulic power lift means 1' through arms 1 and lifting links 3 pivotally connected at their lower ends to the lower links 2.

A draft means or trailer hitch structure 24 comprises side members 12 pivoted to the tractor at their forward ends on a transverse pivot member 11 and arranged to extend rearwardly beneath the tractor rear axle, the side members 12 being connected at their rear ends by a cross-bar 13 carrying a trailer pick-up hook 10 or like device.

When not required for use, the trailer hitch structure is retained in the position shown in the drawing by a securing means or catch means 36 comprising a U-shaped member 14 having a longer leg 16 extending slidably and laterally inwards through a hole 35 in a side member 18 of a draft means or tractor drawbar structure 25 to which is connected a suitable tongue or horizontally swingable draft member 26 which may be pivoted at its forward end at pivot 27 and at its rear end may comprise attaching means 28, said U-shaped member having a short leg 15 which, when turned through approximately 180° from the position shown in the drawing about the axis of the long leg 16, is engageable with a hole 19 in one of the side members 12 of the trailer hitch structure under the influence of a spring 17 associated with the long leg 16 of the member 14.

The lower links 2 are provided with bracket members 2a which project upwardly and forwardly therefrom for the pivotal connection of the lower ends 34 of the lifting links 3 by pivots 5, so as to enable the lower links, when disengaged from the normal draft operating position on the anchorage pivots 8 on the tractor for properly manipulating an associated implement, to be swung from the trailing position shown by broken lines at A to the substantially upright position shown in the drawing, in which the lower ends of the links 2 are engaged with pivots 9 on the trailer hitch structure, the pivots 9 conveniently being provided by extensions 33 of the cross-bar 13 beyond the side members 12.

It will be seen that when the catch means is in the disengaged position shown, the member 14 is retained by the spring 17 with the shorter leg 15 disposed above the side member 18 of the drawbar structure so that the trailer hitch structure is operable by the hydraulic lift means acting through the lifting links 3 and the links 2 to lower the hook 10 or like device to a ground-engaging position for picking up or releasing a trailer having a suitable eye or like connection for engaging with the hook 10 or like device and to raise the trailer hitch structure for picking up the trailer or for returning the structure 12 to the out-of-use position in which it is retained by engagement of the short leg 15 of the catch means with the hole 19. When the trailer hitch structure is retained by the catch means in the upper position, the links 2 may be disengaged from the pivots 9 and engaged with the pivots 8 and thereupon an implement carried by the links may be raised and lowered by the hydraulic lift without raising and lowering movement of the trailer hitch structure.

An abutment and locking member, such as a downwardly projecting pin 20 on a cross-member 21 of the drawbar structure, may be arranged to co-operate with the hook 10 or the like when in the raised position so as to prevent disengagement of the trailer connection therefrom.

By the arrangement according to the invention, whereby the links 2 are used alternatively as the lower links of a three-point linkage and as lifting links for the pick-up hook or like device, the structure is simplified and the operation of the implement-attaching means and trailer hitch means rendered entirely independent of one another.

The term "trailer" used herein includes any form of trailed vehicle or implement.

It will be understood that the invention is not limited to the particular embodiment hereinbefore described. For example, any other suitable form of catch means may be provided for retaining the trailer hitch means in the out-of-use position.

What is claimed is:

1. In a tractor comprising pivots, power lift means having lifting links, and implement attaching means having laterally spaced lower links; a trailer hitch structure attached to said tractor and provided with laterally spaced pivots, said lower links of the implement hitch means being selectively engageable with the pivots on the tractor and the pivots on said trailer hitch structure and being swingable from a trailing position to a substantially upright position for connection thereof with the pivots on the trailer hitch structure, whereby said power lift means is operable to raise and lower the trailer hitch structure, and catch means for retaining said trailer hitch structure in an elevated position when out of use.

2. In a tractor comprising pivots, power lift means having lifting links, and implement attaching means having laterally spaced lower links; a trailer hitch structure attached to said tractor and provided with laterally spaced pivots, said lower links of the implement hitch means being selectively engageable with the pivots on the tractor and the pivots on said trailer hitch structure and being swingable from a trailing position to a substantially upright position for connection thereof with the pivots on the trailer hitch structure, whereby said power lift means is operable to raise and lower the trailer hitch structure, and catch means for retaining said trailer hitch structure in an elevated position when out of use, said trailer hitch structure comprising a rearwardly positioned cross-bar, laterally placed side members, and a pickup hook means carried by said cross-bar, said laterally spaced pivots of the trailer hitch structure being extensions of said cross-bar beyond said side members of the trailer hitch.

3. In a tractor comprising pivots, power lift means having lifting links provided with lower ends, and implement attaching means having laterally spaced lower links; a trailer hitch structure attached to said tractor and provided with laterally spaced pivots, said lower links of the implement hitch means being selectively engageable with the pivots on the tractor and the pivots on said trailer hitch structure and being swingable from a trailing position to a substantially upright position for connection thereof with the pivots on the trailer hitch structure, whereby said power lift means is operable to raise and lower the trailer hitch structure, and catch means for retaining said trailer hitch structure in an elevated position when out of use, said lower links having bracket members intermediate their lengths, said bracket members projecting forwardly from said links when in substantially upright position for pivotal connection to said lower ends of the lifting links of the power lift means.

4. In a tractor comprising pivots, power lift means having lifting links, and implement attaching means having laterally spaced lower links; a trailer hitch structure connected to said tractor and being provided with laterally spaced pivots and a side member having a hole, a tractor drawbar structure attached to said tractor and provided with a side member having a hole, said lower links of the implement hitch means being selectively engageable with the pivots on the tractor and the pivots on said trailer hitch structure and being swingable from a trailing position to a substantially upright position for connection thereof with the pivots on the trailer hitch structure, whereby said power lift means is operable to raise and lower the trailer hitch structure, and manually operated catch means releasably connecting said trailer hitch structure to said tractor drawbar structure to retain said trailer hitch structure in an elevated position when out of use, said catch means comprising a U-shaped member having a longer leg and a shorter leg and a spring associated with said longer leg, said longer leg extending slidably and laterally inwardly through the hole in the side member of said drawbar structure, said shorter leg being selectively positionable above said side member of the tractor drawbar structure in an out of use position and in the hole in said side member of the trailer hitch structure by rotating said U-shaped member 180° about the axis of the longer leg to retain said side member in an elevated position, said U-shaped member being displaceable outwards to permit movement from one position to the other against the action of said spring.

5. In a tractor comprising pivots, power lift means having lifting links, and implement attaching means having laterally spaced lower links, a trailer hitch structure mounted to said tractor and provided with laterally spaced pivots and a hook, a tractor drawbar structure attached to said tractor and having a cross member, said lower links of the implement hitch means being selectively engageable with pivots on the tractor and with the pivots on said trailer hitch structure and being swingable from a trailing position to a substantially upright position for connection thereof with the pivots on the trailer hitch structure, whereby said power lift means is operable to raise and lower the trailer hitch structure, and a locking member on said cross members of the tractor drawbar structure, said locking member comprising a downwardly projecting pin on said cross member and arrangeable to coact with said hook when the implement hitch structure is in the raised position to prevent disengagement of an associated trailer connection therefrom.

6. In a tractor having a framework, a first draft means connected to said framework, a second draft means connected to said framework, lower links releasably connectible in one position to said framework for principally vertical movement with respect thereto and in another position to one of said draft means for principally vertically moving one of said draft means, lift means operably connected to said links, and securing means for releasably connecting said first draft means to said second draft means.

7. In a vehicle having a framework, draft means connected to said framework, link means releasably connectible in one position to said framework for principally vertical movement with respect thereto and in another position to draft means for principally vertically moving said draft means, and lift means operably connected to said link means, said link means acting as a draft connection in one position for connecting an associated implement to the vehicle and in the other position as connections between the draft means and the lift means.

8. In a vehicle having a framework, draft means connected to said framework, link means releasably connectible in one position to said framework for principally vertical movement with respect thereto and in another position to draft means for principally vertically moving said draft means, and lift means operably connected to said link means, said link means acting as a draft connection in one position for connecting an associated implement to the vehicle and in the other position as connections between the draft means and the lift means, and securing means releasably connecting said draft means for an out of use position.

9. In a tractor having a framework, draft means connected to said framework for principally vertical movement with respect thereto, lower links releasably connectible in one position to said framework for principally vertical movement with respect thereto and connectible in another position to said draft means for vertical movement of said draft means, and lift means operably connected to said links.

10. The invention according to claim 9, and comprising other draft means mounted to said framework and securing means for releasably connecting said first draft means with said other draft means.

References Cited in the file of this patent

UNITED STATES PATENTS

| | | |
|---|---|---|
| 2,239,020 | Sheets | Apr. 22, 1941 |
| 2,786,695 | Wilson | Mar. 26, 1957 |
| 2,791,444 | McNeice | May 7, 1957 |
| 2,805,083 | Sherwen | Sept. 3, 1957 |
| 2,826,433 | Poole | Mar. 11, 1958 |

FOREIGN PATENTS

| | | |
|---|---|---|
| 764,787 | Great Britain | Jan. 2, 1957 |